Aug. 4, 1942.                 E. D. TILLYER                 2,291,663
                              OPHTHALMIC LENS
                           Filed Dec. 21, 1939

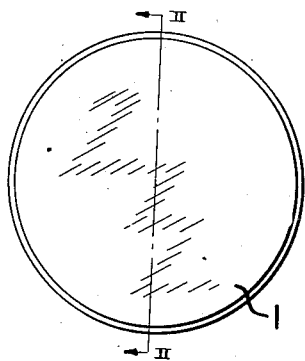 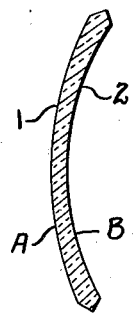

Fig. I            Fig. II

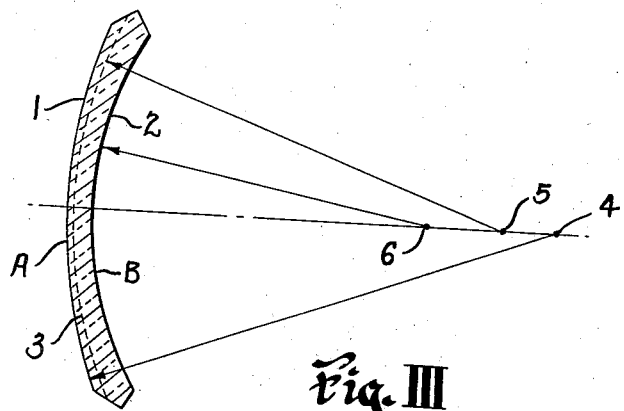

Fig. III

| 'A' SURFACE GROUND OR MOULDED BY MANUFACTURER. | POWER REQUIRED PRESCRIPTION POWER OF FINISHED LENS. | | | 'B' SURFACE FOCAL POWER TO BE PUT ON BY DISPENSER. | | | |
|---|---|---|---|---|---|---|---|
| $A_1$ | $R_{X1}$ | $a'$ | $b'$ | $c'$ | $B_1$ | $a$ | $b$ | $c$ |
| $A_2$ | $R_{X2}$ | $a'$ | $b'$ | $c'$ | $B_2$ | $a$ | $b$ | $c$ |
| $A_3$ | $R_{X3}$ | $a'$ | $b'$ | $c'$ | $B_3$ | $a$ | $b$ | $c$ |
| $A_4$ | $R_{X4}$ | $a'$ | $b'$ | $c'$ | $B_4$ | $a$ | $b$ | $c$ |

Fig. IV

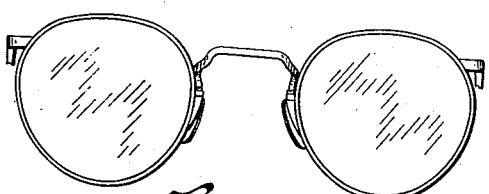

Fig. V

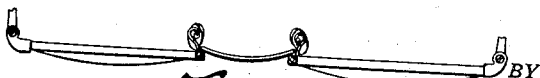

Fig. VI

INVENTOR.
EDGAR D. TILLYER.
BY Harry H. Styll.
ATTORNEY.

Patented Aug. 4, 1942

2,291,663

UNITED STATES PATENT OFFICE 2,291,663

OPHTHALMIC LENS

Edgar D. Tillyer, Southbridge, Mass., assignor to American Optical Company, Southbridge, Mass., a voluntary association of Massachusetts Application December 21, 1939, Serial No. 310,264

5 Claims. (Cl. 88—54)

This invention relates to improvements in lenses, and has particular reference to lenses made of a lens medium of plastic resins or compositions and to improved processes for making and dispensing the same.

A principal object of the invention is to provide a series of blanks for plastic lenses, one surface of which may be either molded or ground and polished and the opposite surface of which is ground and polished with lens tools designed for a lens medium of different index of refraction from that of the blank to be used.

Another object of the invention is to provide a series of lens blanks of plastic material lens medium having a surface modified to compensate for the difference in refractive index of the blank and the lens medium for which the tools used to put on the other surface have been designed.

Another object of the invention is to provide finished lenses of plastic lens medium having one face or surface modified from a surface designed for one index of refraction and the opposite face made from tools designed for another index of refraction yet of the resultant prescription power required.

Another object of the invention is to provide improved processes of making and dispensing lenses of plastic lens material by the use of lens tools designed for a different index of refraction from that of the blank used.

Another object of the invention is to provide improved means for dispensing lenses of plastic lens material with the same facility that lenses of glass lens medium are now dispensed.

Other objects and advantages of the invention will become apparent from the following description taken in conjunction with the accompanying drawing. It will be apparent that many changes in the details of construction, arrangement of parts and steps in the processes may be made without departing from the invention as set forth in the accompanying claims hence it is not desired to limit the invention to matters shown and described as the preferred forms have been set forth by way of illustration only.

Referring to the drawing:

Fig. I is a front view of a lens of the invention;

Fig. II is a cross-section of Fig. I on line II—II thereof;

Fig. III is an enlarged diagrammatic cross-section similar to Fig. II illustrating certain features of the processes of making the lens;

Fig. IV is a diagrammatic chart for use with the invention;

Fig. V is a front elevation of a mounting embodying the lenses of the invention; and Fig. VI is a top view of the mounting illustrated in Fig. V.

The dispensing of lenses to patients in the ophthalmic art is a difficult, expensive, and time consuming operation. The patient's eyes have to be examined by a practitioner and his prescription obtained. This prescription which is individual to the patient has to be made into the required lenses.

It is clear that if these prescription lenses had to be made by the lens manufacturer, the prescription would have to be sent to the factory and the lenses made special to suit. This would be expensive, and time consuming. It would be almost impossible to give service to the patient.

A much more expeditious method is for the manufacturer to make lens blanks finished on one side, and to supply to dispenser with tools for making the other side. In this method the dispenser takes a semi-finished blank made by the manufacturer and puts on the second side to required prescription power. In this way practically twenty-four hour service can be given the patient.

Under this system it is necessary for the dispenser to supply himself with a series of semi-finished blanks and a series of tools for putting on the second side of the lenses. Such a method will work satisfactorily where the lenses are made of a glass lens medium which is held to unvarying index of refraction. The power of a lens is the resultant of the two surfaces, the index of refraction of the medium, and the thickness of the finished lens. The tools for the surfaces are designed to fit the given index of refraction, and are not correct for another index of refraction.

In recent times there have been developed some very good lens mediums of plastic resins which are now available to the art. Some of these have a better light transmission than glass, they are lighter than glass, but so far the index of refraction has not coincided with that of glass. Some of these mediums are hard enough to permit grinding and polishing in a way similar to glass. These mediums also mold with good and usable optical surfaces. It is however apparent at once that it is not at all practicable to dispense these lenses where both surfaces are molded. The manufacturer could mold one surface, but in view of the practically innumerable variations of prescriptions the dispenser could not carry sufficient molds to meet the requirements and again the dispenser is not trained to do molding work. The lenses if made completely by the manufacturer would be too costly and it would take too long to fill the prescription.

It is therefore a principal object of my invention to provide improved means for dispensing lenses of plastic lens medium with the same facility and as inexpensively as glass lenses are now dispensed. Lenses of plastic lens medium have not proven commercially successful as yet primarily due to the fact that they cannot be dispensed economically both as to cost and time.

Referring to the drawing wherein similar reference characters designate corresponding parts throughout:

There is available at the present time a plastic resin lens medium which is hard enough to grind and polish, but its index of refraction is about 1.49 whereas the index of refraction of ophthalmic glass lens medium is about 1.53. The dispensers are now provided with lens grinding and polishing tools designed for the index of refraction of ophthalmic crown glass.

It is clear then that if the manufacturer placed one surface on a lens blank of plastic lens material of this index the resultant lens would not be correct if the second side were put on by the dispenser with tools designed for optical glass.

In the process of the invention the manufacturer either molds or grinds and polishes one surface of the blank, say surface 1. Now if this surface 1 were designed for the index of optical glass the dispenser could put on the second side 2 with his tools, but the index of the blank is different from that of optical glass, so the surface 1 is modified so that when the surface 2 is put on with the tools designed for optical glass the resultant power of the lens will be the prescription surface required.

There is a very large number of tools and consequent variations in prescription powers carried by the dispenser, therefore it is important that the number of different surfaces 1 made by the manufacturer be reduced to a minimum to facilitate manufacture and reduce cost.

I therefore analyze the whole range of prescriptions that the dispenser is equipped to provide and select the smallest number of different surfaces 1 that can be provided to take care of the range of prescriptions. In other words I make a series of blanks, each having a surface 1 different from the other and each adapted to have any one of a series of surfaces B ground on the opposite side, each of the blanks being adapted to use a different series of B surfaces.

I designate these blanks as $A_1$, $A_2$, $A_3$, $A_4$, etc.

Then I make a chart which shows how many different $Rx$ powers of lenses may be made with blank $A_1$, with the various tools B carried by the dispenser.

In this way the dispenser provides himself with a number of units of each series of blanks $A_1$, $A_2$, $A_3$, etc. He has the tools B for the index of optical glass. When the prescription comes into the dispenser he looks at his chart, selects a blank, and a tool therefrom, and grinds and polishes the side 2. The resultant lens will give the required prescriptive power.

Referring to Fig. III, the curve or surface 3 indicated in dotted lines is the surface that would be required for a desired power if the lens were made of ophthalmic glass medium. The surface 1 is the actual surface required to produce the prescription value of the lens when the surface 2 is put on with tools designed for the index of refraction of glass and when the difference of index is a given amount. It is to be understood that a variation in the index would produce a difference in the required curvature of the surface 1.

The centers 4, 5 and 6 represent the centers of curvature of the surfaces 1, 3 and 2 respectively.

The advantage of this process is that units of $A_1$ series may be used with many of the B tools of the dispenser in various parts of the range of required prescriptions, and consequently the number of different blanks in the series may be held down to a practicable minimum.

In this way lenses of plastic lens medium may be dispensed to the patient with a minimum of cost and in a minimum of time.

The surfaces $A_1$, $A_2$, etc. of course are mathematically computed by calculations well understood by lens calculators and based on the index of refraction of the lens medium of the blank as well as that of the materials for which the tools for the second side were designed.

The surfaces may be any of the well known ophthalmic lens surfaces, flat, spherical, cylindrical, toric, etc.

The surface 1 is a modified surface, hence it differs from a surface that would be required for the same power if the index of refraction of the material were that of an ophthalmic glass blank.

If there were only one lens of a given power required the surface 1 would be made exactly to the surface which as modified according to index and in combination with the B tool would give the exact prescription power required. Unfortunately however this would mean practically that there would be a separate A surface for each prescription required. This would be impracticable for commercial use and requirements. As is well known there may be a variation from exact power required without affecting injuriously the vision of the patient as long as it is kept within calculated limits of error. In the weaker powers this variation would be smaller than in the stronger powers, therefore I could make the variation in a part of the range $\frac{1}{8}$ diopter either side of exact power required, and in other parts of the range $\frac{1}{4}$ diopter either side of required power. This permissible variation enables me to provide a number of different powers for which each surface may be used instead of a single power, and in this way greatly reduce the number of different A surfaces needed, and to increase the number of B tools with which each may be used. It is this series effect that greatly enhances the value of this invention and adapts it to practical use.

As illustrated in the chart of Fig. IV, a blank having a finished surface $A_1$ which is modified according to the index of refraction of the material and so as to provide a mean of a series of exact curvatures lying within practical limits of error, which may provide any one of the prescription powers $Rx_1a^1$, $Rx_1b^1$, $Rx_1c^1$, etc. upon the use respectively of tools having the curvatures $B_1a$, $B_1b$, $B_1c$, etc. which are ordinarily used in the forming of lenses of the glass standard of index of refraction 1.

The surfaces $A_1$, $A_2$, $A_3$, $A_4$, etc. each represent a mean of a different series of exact curvatures and each may be used in combination with any one of a series of B surfaces to provide one of a series of prescription powers.

This invention is of great importance in the dispensing of plastic resin lenses as it concerns equipment already in use and reduces the cost and time of dispensing these lenses from that in effect now.

From the foregoing it will be seen that I have provided simple, efficient, and economical means for obtaining all the objects and advantages of the invention.

Having described my invention, I claim:

1. A lens which is the unit of a series of ophthalmic lens blanks of plastic transparent synthetic resinous lens composition having an index of refraction different from the index of refraction of a standardized lens medium for which standard commercial abrading tools are provided and which is finished on one side thereof by said abrading tools, said resinous lens composition having a hardness which approaches that of the standardized lens medium to the extent that like said lens medium it may be ground and polished, each of the respective blanks which constitute the given series having a finished optical surface on one side thereof, said finished optical surface for each of the lenses of said series being of a given modified radius of curvature which is modified according to the given difference of index of refraction of said resinous lens composition from said standardized lens medium for which the standard abrading tools have been provided, the resultant blanks of said series being such that a second surface may be formed on the opposed sides thereof by the standard commercial abrading tools and which, when combined with the first surface, will produce substantially the required prescriptive value desired of the finished lens, said first surface of said series being such that, when the second surface is formed thereon by said standard abrading tools, the said blanks will produce a range of different focal powers with all of said powers of said series being within the limits of from 1/8 to 1/4 of a diopter above or below the exact prescriptive powers desired of the respective lenses of said series.

2. A lens which is the unit of a series of ophthalmic lens blanks of plastic transparent synthetic resinous lens composition having an index of refraction different from that of optical crown glass for which standard commercial abrading tools are provided and which is finished on one side thereof by said abrading tools, said resinous lens composition having a hardness which approaches that of the standardized lens medium to the extent that like said lens medium it may be ground and polished, each of the respective blanks which constitute the given series having a finished optical surface on one side thereof, said finished optical surface for each of the lenses of said series being of a given modified radius of curvature which is modified according to the given difference of index of refraction of said resinous lens composition from said standardized lens medium for which the standard abrading tools have been provided, the resultant blanks of said series being such that a second surface may be formed on the opposed sides thereof by the standard commercial abrading tools and which, when combined with the first surface, will produce the required prescriptive value desired of the finished lens, said first surface of said series being such that, when the second surface is formed thereon by said standard abrading tools, the said blanks will produce a range of different focal powers with all of said powers of said series being within the limits of from 1/8 to 1/4 of a diopter above or below the exact prescriptive powers desired of the respective lens of said series.

3. A lens blank for an ophthalmic lens which is a unit of a series of ophthalmic lens blanks, said units being of a transparent plastic resinous lens medium having an index of refraction different from the index of refraction of a standardized lens medium for which standard commercial abrading tools are provided and which is finished on one side thereof by said abrading tools, said resinous lens composition having a hardness which approaches that of the standardized lens medium to the extent that like said lens medium it may be ground and polished, each of the respective blanks which constitute the given series having a finished optical surface on one side thereof, said finished optical surface for each of the lenses of said series being of a given modified radius of curvature which is modified according to the given difference of index of refraction of said resinous lens composition from said standardized lens medium for which the standard abrading tools have been provided, the resultant blanks of said series being such that a second surface may be formed on the opposed sides thereof by the standard commercial abrading tools and which, when combined with the first surface, will produce substantially the required prescriptive value desired of the finished lens, said first surface of said series being such that, when the second surface is formed thereon by said standard abrading tools, the said blanks will produce a range of different focal powers with all of said powers of said series being within the limits of from 1/8 to 1/4 of a diopter above or below the exact prescriptive powers desired of the respective lenses of said series.

4. An opthalmic mounting comprising lenses, means for holding said lenses in spaced aligned position before the eyes, each of said lenses being a unit of a series of ophthalmic lens blanks, said units being of a transparent plastic resinous lens medium having an index of refraction different from the index of refraction of a standardized lens medium for which standard commercial abrading tools are provided and which is finished on one side thereof by said abrading tools, said resinous lens composition having a hardness which approaches that of the standardized lens medium to the extent that like said lens medium it may be ground and polished, each of the respective blanks which constitute the given series having a finished optical surface on one side thereof, said finished optical surface for each of the lenses of said series being of a given modified radius of curvature which is modified according to the given difference of index of refraction of said resinous lens composition from said standardized lens medium for which the standard abrading tools have been provided, the resultant blanks of said series being such that a second surface may be formed on the opposed sides thereof by the standard commercial abrading tools and which, when combined with the first surface, will produce substantially the required prescriptive value desired of the finished lens, said first surface of said series being such that, when the second surface is formed thereon by said standard abrading tools, the said blanks will produce a range of different focal powers with all of said powers of said series being within the limits of from 1/8 to 1/4 of a diopter above or below the exact prescriptive powers desired of the respective lenses of said series.

5. The process of making an ophthalmic lens comprising making a series of ophthalmic lens blanks from a transparent plastic resinous lens medium having an index of refraction different from the index of refraction of a standardized lens medium for which standard commercial abrading tools are provided and of a hardness which approaches that of the standardized lens medium to the extent that like said lens medium they may be ground and polished, forming on one side of said blanks of said series a finished optical surface which is of the same curvature for each of the respective blanks with the said curvature being modified according to the difference of index of refraction of said resinous lens medium from said standard lens medium for which the said standard abrading tools have been provided and such that a second surface may be formed on the opposed sides of said blanks by said standard commercial abrading tools with said surfaces formed by said commercial abrading tools being such as to produce a range of different focal powers when combined with said first surfaces with all of said powers of said series being within the limits of from $\frac{1}{8}$ to $\frac{1}{4}$ of a diopter above or below the exact prescriptive powers desired of the respective lenses of said series.

EDGAR D. TILLYER.